United States Patent [19]

Theurer et al.

[11] Patent Number: 4,490,038
[45] Date of Patent: Dec. 25, 1984

[54] MOBILE APPARATUS FOR DETERMINING THE LATERAL POSITION OF A RAILROAD TRACK

[75] Inventors: Jose Theurer; Klaus Riessberger, both of Vienna, Austria

[73] Assignee: Franz Plasser Bahnbaumaschinen-Industriegesellschaft m.b.H., Vienna, Austria

[21] Appl. No.: 336,555

[22] Filed: Jan. 4, 1982

[30] Foreign Application Priority Data

Feb. 12, 1981 [AT] Austria .................................. 664/81

[51] Int. Cl.³ .......................... G01C 3/08; E01B 35/02
[52] U.S. Cl. ......................................... 356/5; 33/338; 356/1; 356/4
[58] Field of Search ..................... 356/1, 4, 5; 33/338, 33/287

[56] References Cited

U.S. PATENT DOCUMENTS

| | | | |
|---|---|---|---|
| 3,705,772 | 12/1972 | Andreas | 356/5 |
| 3,990,154 | 11/1976 | Theurer et al. | 33/144 |
| 4,179,216 | 12/1979 | Theurer et al. | 356/4 |
| 4,180,322 | 12/1979 | Farcinade | 356/1 |
| 4,259,018 | 3/1981 | Poirier | 356/1 |

FOREIGN PATENT DOCUMENTS 1083061  9/1967  United Kingdom .

Primary Examiner—S. C. Buczinski
Attorney, Agent, or Firm—Kurt Kelman

[57] ABSTRACT

A mobile apparatus for determining the lateral position of a railroad track with respect to an adjacent railroad track without physical contact with the adjacent railroad track and for indicating the determined lateral position, which comprises a carriage mounted for movement along the railroad track, a laser beam emitting and receiving instrument mounted on the carriage for focussing on the adjacent railroad track and fixed parts of the right of way to measure the distance thereof from the instrument, the instrument having coincident optical axes for emitting and receiving the laser beam and said axes extending in a transverse plane perpendicular to the track, and means for indicating the measured distance.

6 Claims, 3 Drawing Figures

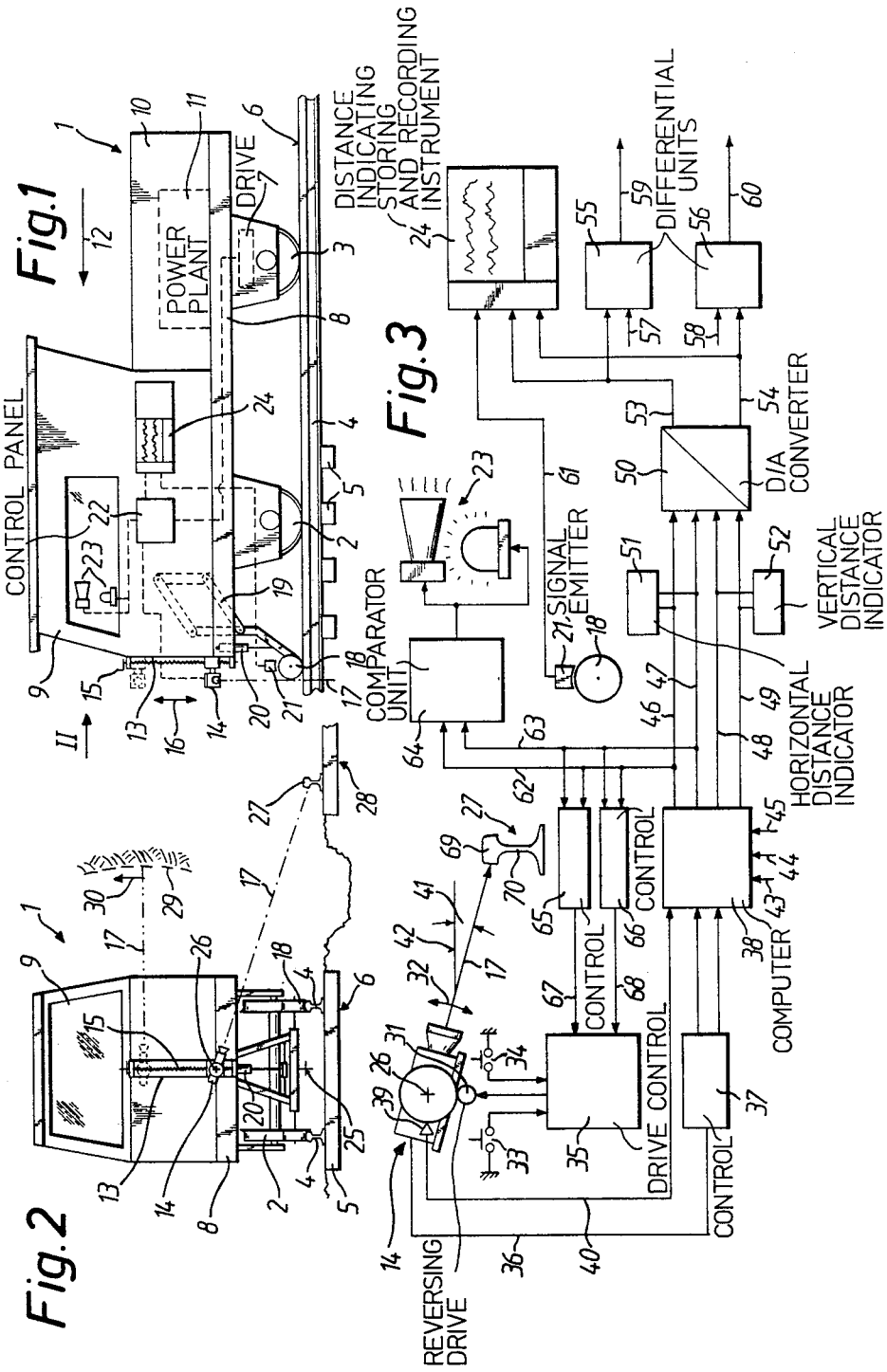

MOBILE APPARATUS FOR DETERMINING THE LATERAL POSITION OF A RAILROAD TRACK

The present invention relates to a mobile apparatus for determining the lateral position of a railroad track with respect to an adjacent railroad track without physical contact with the adjacent railroad track and for indicating the determined lateral position.

British patent No. 1,083,061, published Sept. 13, 1967, discloses such an apparatus comprising a carriage mounted for movement along the railroad track. In this apparatus, two television cameras are spaced apart in the direction of the track elongation and are so focussed on the adjacent track that their optical axes intersect in the range of the rail of the adjacent track which is located closer to the railroad track on which the carriage moves the television cameras. The images obtained by the two cameras are projected side-by-side on a common screen. The two pictures must have a predetermined positional relationship to indicate a constant distance from the closer rail of the adjacent track. For this purpose, the two television cameras are mounted on a slide which is displaceable in a direction transverse to the track on which the carriage moves and this slide is constantly displaced by the operator of the apparatus in response to the view on the screen that the predetermined positional relationship between the two pictures remains unchanged. The front end of a track lining reference system is connected to the slide so that this system is maintained substantially at a constant distance from the adjacent railroad track. The operation of this apparatus requires considerable concentration and attention of the operator to assure a substantially parallel extension of the lined track in relation to the adjacent track under the control of the reference system. The measured distances between the tracks are neither indicated nor recorded.

Our U.S. Pat. No. 4,179,216, dated Dec. 18, 1979, discloses a mobile apparatus for measuring the profile of a railroad tunnel and uses a laser beam emitting and receiving instrument for sighting the tunnel wall. The instrument is mounted at the front of a carriage moving along a railroad track and is rotatable about a pivot axis extending parallel to the track. The instrument is rotated in synchronism with the drive of the carriage so that the laser beam, which extends perpendicularly to the pivot axis, sweeps over the tunnel wall in a helical path. The instrument has coincident optical axes for emitting and receiving the laser beam and the measured distances are continuously indicated and recorded. The indicated and recorded data make it possible to determine the profile of the tunnel and the relative position of the track to an accuracy of centimeters. In this manner, it is possible to locate any narrowing of the tunnel and the feasibility of transporting loads of given widths through the tunnel.

Our U.S. Pat. No. 3,990,154, dated Nov. 9, 1976, discloses a mechanically operating apparatus for determining the lateral position of a railroad track with respect to an adjacent railroad track. This apparatus comprises a laterally projecting arm carrying a measuring head guided along a rail of the adjacent track. The measured distances are indicated on a scale and a corresponding measuring signal is transmitted to a recording device.

It is the primary object of this invention to provide a mobile apparatus of the first-described type with which the lateral position may be quickly and dependably determined continuously or intermittently with high accuracy.

This and other objects are accomplished according to the invention with a laser beam emitting and receiving instrument mounted on the carriage for focussing on the adjacent railroad track and fixed parts of the right of way to measure the distance thereof from the instrument, the instrument having coincident optical axes for emitting and receiving the laser beam and the axes extending in a transverse plane perpendicular to the track. The apparatus also comprises means for indicating the measured distance.

Without requiring physical contact, this apparatus for the first time makes it possible to determine and indicate data relating to the distance of a railroad track to an adjacent railroad track and which is not influenced by outside light and may be used in the dark. In addition, the apparatus makes it possible to control track work rapidly and dependably with high accuracy to obtain a constant distance between two adjacent tracks.

The above and other objects, advantages and features of the present invention will become more apparent from the following detailed description of a now preferred embodiment of the apparatus, taken in conjunction with the accompanying somewhat schematic drawing wherein FIG. 1 is a side elevational view of a mobile apparatus according to this invention;

FIG. 2 is a front elevational view of this apparatus, seen in the direction of arrow II of FIG. 1; and FIG. 3 is a circuit diagram illustrating the functional principles of the apparatus.

Referring now to the drawing and first to FIG. 1, there is shown a mobile apparatus for determining the lateral position of railroad track 6 with respect to adjacent railroad track 28 (see FIG. 2) by sighting and without physical contact with the adjacent railroad track and for indicating the determined lateral position. This apparatus comprises measuring car 1 comprising carriage 8 mounted for movement along railroad track 6 comprised of rails 4 fastened to ties 5. Undercarriages 2, 3 support the carriage on the track and drive 7 moves the carriage along the track. The carriage is equipped with an operator's cab 9 and a box-shaped structure 10 which contains power plant 11 of the car. Arrow 12 indicates the normal operating direction of the car.

Distance measuring or sighting instrument 14 is mounted on the carriage at the front of operator's cab 9 on vertical guide 13 and drive means 15 enables the instrument to be vertically adjusted on the carriage, the illustrated vertical adjustment drive means being a manually operated threaded spindle. The instrument is capable of continuously, step-by-step or intermittently measuring the profile of a tunnel surrounding railroad track 6 or of determining the lateral position of the track with respect of adjacent railroad track 28, simply by adjusting the vertical position of the instrument in a manner to be explained more fully hereinafter in connection with FIG. 2. In this manner, existing tunnel profile measuring apparatus may be readily adapted to operate according to this invention.

Distance measuring or sighting instrument 14 is a laser beam emitting and receiving instrument mounted on carriage 8 for focussing on adjacent railroad track 28 and fixed parts of the right of way, such as a railway station platform, to measure the distance thereof from the instrument. The instrument has coincident optical axes 17 for emitting and receiving the laser beam and the optical axes extend in a transverse plane perpendicular to track 6 and its longitudinal center line 25. The distance is measured by such an instrument on the basis of the time elapsed between emitting a laser beam focussed on the object whose distance is to be determined along the optical axis and receiving the laser beam reflected along this axis from the object. The accuracy of the distance measurements by such instruments, which are substantially insensitive to ambient light, depends on the adjustment of the instrument within the millimeter or centimeter range.

Measuring car 1 is equipped with odometer 18 vertically adjustably mounted on carriage 8 by parallelogram linkage 19 operated by hydraulic piston-and-cylinder drive 20 to engage the odometer with track 6 and to disengage it therefrom, as desired. The odometer is connected to signal emitter 21, for example an inductive pulsator, whose electrical output signals indicate the length of the path traversed by moving car 1.

Control panel 22 is arranged in operator's cab 9 and is connected in a manner to be described in detail hereinafter in connection with FIG. 3 with laser beam emitting and receiving instrument 14, drive 7 for car 1, signaling device 23 and means 24 for indicating, storing and recording the measured distance. The measured distance indicating and recording means 24 is also connected to odometer signal emitter 21.

FIG. 2 shows a lower measuring position of instrument 14 in full lines and an upper measuring position in broken lines. The instrument is mounted for rotation about pivoting axis 26 extending parallel to longitudinal center line 25 of track 6 and drive 31 is arranged for reversibly pivoting optical axes 17 of instrument 14 in the perpendicular plane extending transversely of center line 25. The pivoting drive may preferably be a stepping motor. In this manner, the laser beam emitted by the instrument may be focussed on rail head 69 (see FIG. 3) of rail 27 of adjacent track 28 closest to track 6 in the lower measuring position, the optical axes of the instrument being focussed at an angle on the rail head to determine the lateral position of track 6 with respect to adjacent track 28. Upon operation of threaded vertical adjustment spindle 15, the instrument may be moved to its upper measuring position where it may be pivoted about axis 26 in synchronism with the car drive 7 to sweep over wall 29 of a tunnel in the direction of arrow 30 along a helical path to measure the profile of the tunnel. This arrangement enables the focussed laser beam fully automatically to sense the contour of the rail of the adjacent track, particularly its rail head, the field side of the rail head serving as reference plane for the distance measurement and the pivoting of the optical axes of the instrument maintaining an effective sensing and measuring range even if the two tracks are at different grades or their superelevation differs.

FIG. 3 schematically illustrates the control circuit for the operation of a preferred embodiment of the apparatus of this invention for determining the lateral position of railroad track 6 with respect to adjacent railroad track 28 without physical contact with the adjacent railroad track and for indicating the determined lateral position. Drive 31 is connected to instrument 14 for reversibly pivoting optical axes 17 of the instrument in the directions indicated by double-headed arrow 32. Limit switches 33, 34 are associated with, and operable by instrument 14 for limiting the pivoting angle of the optical axes of the instrument, operation of a respective limit switch causing reversal of drive 31. The limit switches are connected to control unit 35 which controls drive 31 and reverses the same in response to signals from the limit switches. This arrangement enables the pivoting range of instrument 14 to be limited to that required for sensing rail head 69 and thus considerably reduces the time required for each measurement.

The illustrated circuit further comprises signal emitter 39 indicating angle 41 at which optical axes 17 are focussed on rail head 69 and computer means 38 connected to instrument 14 and signal emitter 39 by lines 36 and 40, respectively, for determining at least the horizontal distance from the instrument to the rail head. Line 36 feeds the distance measurement output signal of instrument 14 to control 37 connected to computer 38. Angle 41 is defined between optical axes 17 and horizontal plane 42 parallel to the plane defined by track 6. This arrangement makes it possible continuously to compute the lateral position of track 6 with respect to track 28, which is determined by the horizontal distance from the instrument to the rail head, on the basis of the output signal from instrument 14 indicating the measured distance, the output signal of emitter 39 indicating angle 41, and the geometric constants indicating the relative position of instrument 14 on carriage 8 and with respect to the track. Inputs 43 and 44 feed the geometric constants to computer 38, these constants consisting of the coordinates, i.e. the lateral and vertical distances of pivoting axis 26 of instrument 14 from longitudinal center line 25 of track 6 or from a coordinate system origin which may be a reference edge of one of rails 4 of the track. Input 45 feeds the parameter of superelevation of track 6 to computer 38. The computer computes the horizontal and vertical distance of track 6 from track 28 on the basis of the input signals it receives and the output of the computer is transmitted to digital-/analog converter 50 by output lines 46, 47, 48 and 49. Indicating instruments 51 and 52 are respectively connected to lines 46, 47 and 48, 49 for respectively indicating the horizontal and vertical distances of tracks 6 and 28 separately. The respective analog signals for these distances are transmitted by lines 53 and 54 to indicating and recording device 24, and are separately delivered to differential units 55 and 56. Second input 57 of differential unit 55 receives the desired value of the vertical distance or track level and second input 58 of differential unit 56 receives the desired value of the horizontal distance of track 6 from track 28. Differential unit 55 emits a control signal at output 59 which corresponds to the difference between the levels of tracks 6 and 28. Differential unit 56 emits a control signal at output 60 which corresponds to a deviation of the horizontal distance between the tracks from a desired horizontal distance therebetween. If mobile apparatus 1 is constituted as a track surfacing machine comprising means for correcting the position of railroad track 6, the control signals from differential units 55 and 56 may be used for controlling the track position correcting means in response to the measured distances. This provides an automatic control for the operation of a track correction which requires very little space and, therefore, may be readily built into existing track liners and/or leveling machines. In this manner, the invention considerably enlarges available techniques useful particularly in track lining.

Line 61 connects odometer signal emitter 21 to indicating and recording device 24 so that the horizontal and vertical distance of track 28 from track 6 as related to the distance traveled by car 1 may be separately indicated and recorded, for instance by a curve on a paper band.

Furthermore, the apparatus comprises signaling device 23 connected to the laser beam emitting and receiving instrument and, in the illustrated embodiment, this device is capable of emitting acoustical and optical signals. If desired, other types of signals perceptible by the operator in cab 9 may be emitted by device 23. In this manner, the operator may be warned about any deviation of the measured distance from a desired distance. It may be most useful to have a constant signal indicating conformity of the actual distance with the desired distance within a given tolerance limit, for instance by the use of a control light, and a blinking light of different colors or any other type of readily perceived signal to indicate when the measured distance either is less or more than the desired distance. In the illustrated embodiment, signaling device 23 is connected to computer means 38 so that the signaling device is responsive to deviations of the determined distance from a desired distance, an output signal of the computer means controlling the operation of the signaling device.

As shown in the preferred embodiment of FIG. 3, branch lines 62, 63 lead from computer output lines 46, 47 to comparator unit 64 whose output is connected to signaling device 23 to deliver control signals corresponding to the distance of adjacent track 28 from track 6 to the signaling device, these control signals being simultaneously delivered to control elements 65, 66 connected to branch lines 62, 63. These control elements operate control unit 35 for actuating pivoting drive 31, the control unit being connected to the control elements by lines 67, 68. Comparator unit 64 is pre-adjusted to store admissible maximum and minimum distances to the adjacent railroad track. Control unit 35 connected to computer means 38 for reversing device means 31 to pivot optical axes 17 of instrument 14 in opposite directions is responsive to sudden changes in the measured distance. This very simple additional control equipment enables the entire measuring procedure to be automated.

The operation of the mobile apparatus will partly be obvious from the above description of its structure and will be set forth hereinbelow in further detail.

At the beginning of the measuring process, parallelogram support 19 is operated by drive 20 to lower odometer 18 into contact with track 6. Spindle 15 is then operated to bring laser emitting and receiving instrument 14 into its lower measuring position to enable coinciding optical axes 17 to be focussed on rail head 69 of rail 27 of adjacent railroad track 28 which is closest to track 6. In this measuring position of instrument 14, a plurality of separate and sequential individual measurements, for instance one hundred, are performed in accordance with the pulse frequency of the laser beam emitter and the average value of these separate measurements is established. For example, if the pulse frequency is 400 Hz and an average value of hundred measurements is established, the entire time for measuring the distance to rail head 69 amounts to one quarter of a second. During the time of measurement, instrument 14 remains in a fixed position. After the measurement has been completed, drive 31 is operated by control unit 35 to pivot optical axis 17 quickly upwardly by a very small angle. During the pivoting of the instrument, no measurement is made, the next measurement being started only after instrument 14 is held stationary again.

When optical axis 17 of instrument 14 is upwardly pivoted beyond rail head 69, the measured distance jumps markedly and this jump is noted when it exceeds a minimum magnitude, causing the last measurement before the jump to be stored and indicated. At the same time, control element 65 responds to the maximum distance pre-adjusted in comparator unit 64 and its output signal 67 causes control unit 35 to reverse drive 31 and to pivot instrument 14 clockwise about axis 26 to the original position indicated in FIG. 3. Car 1 is then driven to the next measuring point along track 6 and the above-described measuring process is repeated there.

In an alternative measuring procedure, the beam emitting pulse frequency of distance measurement or sighting instrument 14 is increased to obtain a measurement accuracy to about 1 to 2 mm, which makes it possible to sense the profile of rail 27. In this procedure, coinciding optical axes 17 of the sighting instrument is first focussed on web 70 of rail 27 and is then continuously pivoted upwardly (counterclockwise) by drive 31, the measured distance first decreasing in the range of rail head 69 and then increasing again in the upper edge range of the rail head. During the increase of the measured distance, control elements 65 and 66 will alternately cause control unit 35 to reverse the rotary direction of drive 31 so that optical axis 17 will continuously reciprocate between rail web 70 and the upper edge of rail head 69. The measured minimum distance to rail head 69 will be indicated and recorded.

In both variants of the measuring procedure, the horizontal distance computed in computer means 38 is compared with the pre-adjusted values of admissible maximum and minimum distances to adjacent railroad track 28 stored in comparator unit 64, and the prevailing track conditions are signaled to the operator by signaling device 23. For example, the maintenance of the distance of track 28 from track 6 within set tolerance limits may be indicated by a constant optical or acoustical signal while a deviation from such tolerance limits may be indicated by different intermittent signals, a blinking light of one color indicating, for example, that track 6 is too close to track 28 while a blinking light of another color indicates that the tracks are too far apart.

While the invention has been illustrated in conjunction with a measuring car, other carriages may be used, such as mobile track surfacing machines, particularly track liners, equipped with the sighting instrument of this invention. Also, the carriage on which the instrument is mounted need not be self-propelled, as shown, but may be coupled to a tractor. Also, the instrument may be used not only for measuring the distance to an adjacent railroad track but also to any fixed part which must be securely spaced from a track, such as a railroad station platform.

What is claimed is:

1. A mobile apparatus for determining the lateral position of a railroad track with respect to an adjacent railroad track without physical contact with the adjacent railroad track and for indicating the determined lateral position, the adjacent railroad track having a rail including a rail head, which comprises
   (a) a carriage mounted for movement along the railroad track,
   (b) a laser beam emitting and receiving instrument mounted on the carriage for focussing on the adjacent railroad track to measure the distance thereof from the instrument, the instrument having coincident optical axes for emitting and receiving the laser beam, said axes being focussed at an angle on the rail head and said axes extending in a transverse plane perpendicular to the track,
(c) means for indicating the measured distance,
(d) a signaling device connected to the laser beam emitting and receiving instrument and responsive to a deviation of the measured distance from a desired distance of the adjacent track,
(e) a signal emitter indicating the angle,
(f) computer means connected to the instrument and to the signal emitter for determining at least the horizontal distance from the instrument to the rail head,
(g) a comparator unit connecting the signaling device to the computer means, the comparator unit being pre-adjusted to store admissible maximum and minimum distances to the adjacent railroad track,
(h) a drive for reversibly pivoting the optical axes of the instrument in the perpendicular plane, and
(i) a control unit connected to the computer means for reversing the drive to pivot the optical axes of the instrument in an opposite direction after the distance has been measured, the control unit being responsive to sudden changes in the measured distance.

2. The mobile apparatus of claim 1, further comprising means for recording the indicated measured distance.

3. The mobile apparatus of claim 1, further comprising means for storing parameters indicating the measured distance.

4. The mobile apparatus of claim 1, wherein the drive is a stepping motor.

5. The mobile apparatus of claim 1, wherein the control unit comprises limit switches associated with, and operable by, the instrument for limiting the pivoting range of the optical axes of the instrument, operation of a respective one of the limit switches causing reversal of the drive.

6. The mobile apparatus of claim 1, further comprising a drive means for vertically adjusting the instrument on the carriage, the instrument being capable of selectively measuring the profile of a tunnel surrounding the railroad tracks or the distance between the adjacent railroad tracks.

* * * * *